(12) United States Patent
Watanabe et al.

(10) Patent No.: US 6,690,011 B2
(45) Date of Patent: Feb. 10, 2004

(54) INFRARED IMAGE-PROCESSING APPARATUS

(75) Inventors: Masahito Watanabe, Utsunomiya (JP); Nobuharu Nagaoka, Nasu-gun (JP); Takayuki Tsuji, Utsunomiya (JP); Hiroshi Hattori, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/341,634

(22) Filed: Jan. 14, 2003

(65) Prior Publication Data

US 2003/0137593 A1 Jul. 24, 2003

(30) Foreign Application Priority Data

Jan. 18, 2002 (JP) ......................................... 2002-010575

(51) Int. Cl.[7] ............................... G01J 5/02; G06K 9/46
(52) U.S. Cl. ........................ 250/330; 250/340; 382/371; 382/372
(58) Field of Search .................... 250/330, 331, 250/332, 333, 334, 338.1, 339.01, 339.02, 340; 382/162, 163, 164, 168, 171, 172, 276, 282

(56) References Cited

U.S. PATENT DOCUMENTS 5,878,163 A * 3/1999 Stephan et al. ............. 382/172
6,269,186 B1 * 7/2001 Makita ....................... 382/172

* cited by examiner

Primary Examiner—Constantine Hannaher
Assistant Examiner—Timothy Moran
(74) Attorney, Agent, or Firm—Carrier, Blackman & Associates, P.C.; Joseph P. Carrier; William D. Blackman

(57) ABSTRACT

An infrared image-processing apparatus capable of binarization processing in response to the change of the brightness histogram includes an image-processing unit which executes a binarization processing for an infrared image using a threshold brightness value determined in a previous processing, and calculates an area ratio P. When the binarization area ratio P is below a prescribed value $\alpha$ (%), and if the threshold brightness value is not the minimum threshold brightness value Mm_TH, the threshold brightness value ITH is reduced by subtracting a predetermined ratio. Similarly, when the binarization area ratio P is above predetermined value $\beta$ (%), and the threshold brightness value is not the maximum threshold brightness value Max_TH, the threshold brightness value is increased by incrementing a prescribed value to the threshold brightness value ITH.

4 Claims, 11 Drawing Sheets

P1 TO P4 ARE OBJECTS

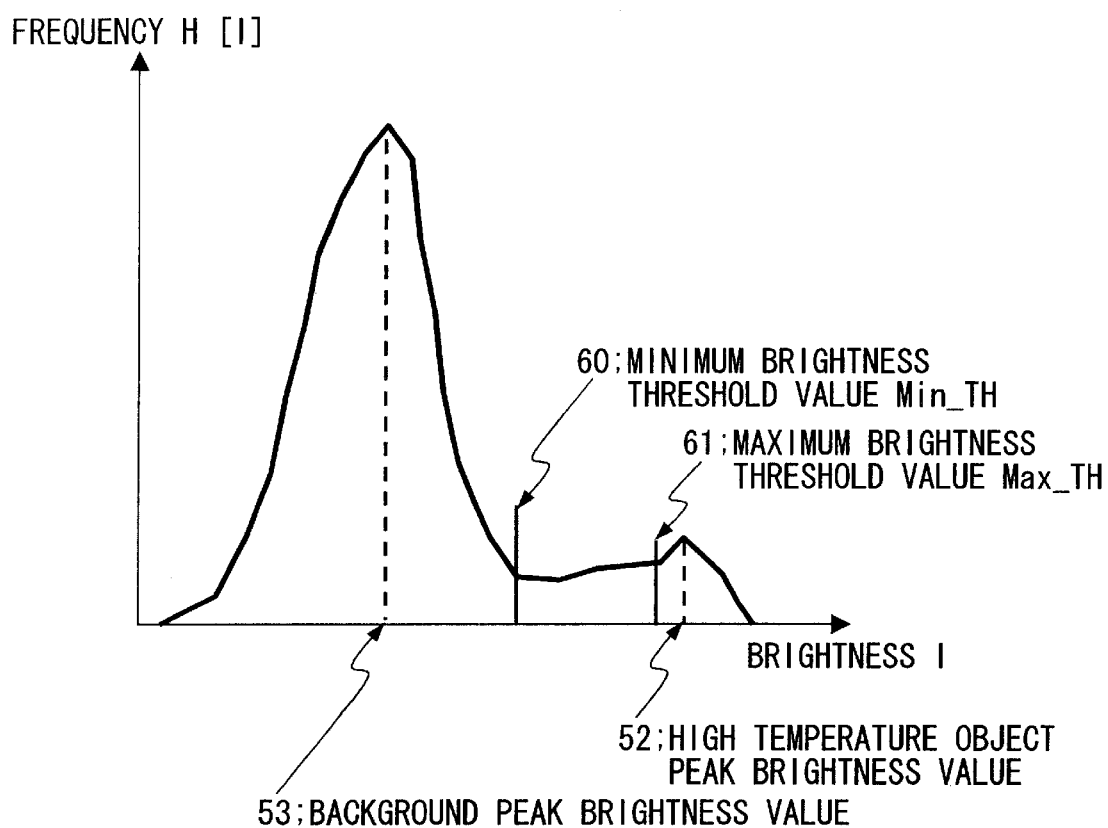

INFRARED IMAGE-PROCESSING APPARATUS

BACKGROUND OF THE INVENTION

1. Field of the Invention

The present invention relates to an infrared image-processing apparatus for extracting an object by binarization processing of an image picked up by an infrared camera.

2. Description of the Related Art

Conventionally, when an object such as a pedestrian or a vehicle is extracted from an image picked up by an infrared camera, binarization processing is carried out in order to distinguish the object image from a background image. Binarization processing of an image distinguishes the object image from the background image included in the image captured by the infrared camera. The distinguishing of the object image from the background image is performed by setting a threshold brightness value which separates two peaks (background peak and object peak) obtained in the brightness histogram as the peak frequency of pixels appearing at a relatively low brightness range as background and at relatively high brightness range as the object.

A conventional example of an infrared image-processing apparatus which carries out binarization processing of the infrared image by setting a threshold brightness value between the background peak and the object peaks obtained on the brightness histogram of the infrared image is disclosed in Japanese Unexamined Patent Application, First Publication No. 2001-160144. This document discloses a conventional image-processing device, which prepares a histogram from two images captured by a stereo camera as a function of the brightness value I shown on the abscissa and a frequency of pixels H [I] having the brightness value I on the vertical line, two brightness values corresponding to the object peaks and the background peaks are obtained, and the contrast values of two images picked up by the stereo camera are compared. One of the two images having a higher contrast value is selected as a reference image, and binarization processing is performed for the reference image using the threshold value of the selected image and an object is extracted from the binarized image.

The aforementioned image-processing apparatus makes it possible to avoid the failure in determining the object because of the differences of the contrast between two images picked up by the stereo camera.

However, when peak positions of the background peak and the object peak in the brightness histogram of the infrared images change because of a change of the amount of infrared radiation from the object, or because of a change in the season, weather, time of day, and ambient temperature, the problems arise in the aforementioned conventional infrared processing apparatus in that the object cannot be extracted accurately or something other than the object is extracted.

SUMMARY OF THE INVENTION

The present invention is made to solve the above problems and to provide an infrared image-processing apparatus capable of accurately extracting an object in response to a change in the brightness histograin of the infrared image captured by the infrared camera.

A first aspect of the present invention provides an infrared image-processing apparatus, which executes a binarization process for an infrared image captured by an infrared camera by setting a threshold value (for example, the threshold value ITH in the embodiment) in between two brightness values corresponding to two peak frequencies appearing in the brightness histogram, which are respectively connected to a background image and an object image, comprising a brightness threshold value setting section (for example, step S4 in the first and second embodiments, steps S31–S45 in the first embodiment, and steps S46 to S49 in the second embodiment) for changing said threshold value such that the area ratio of the object image extracted by said binarization process is set in a predetermined range.

By constituting the infrared image-processing apparatus as described above, it becomes possible for the present infrared image-processing apparatus to extract an object by the binarization process without being affected by the noise of the background image by changing the threshold value for separating the object such that the area ratio of the object image is set in a predetermined area range.

According to the second aspect of the present invention, in the above infrared image-processing apparatus, said brightness value setting section comprises in advance a lower limit, that is, a minimum brightness value, which is above the brightness value corresponding to the peak frequency associated with the background image in the brightness-frequency histogram, and an upper limit, that is, a maximum brightness value, which is below the brightness value corresponding to the peak frequency associated with the object image in the brightness frequency histogram.

By constituting the infrared image-processing apparatus as described above, the binarization process makes it possible to extract the object image without fail, eliminating the chance of failing to extract the object image, i.e., by changing the threshold value limiting the object area ratio to be within a range between the minimum brightness value and the maximum brightness value when the threshold value is changed such that the object area ratio is within a predetermined range.

BRIEF DESCRIPTION OF THE DRAWINGS

FIG. 11 is a diagram showing a setting process for the maximum brightness threshold value according to the first embodiment of the present invention.

DETAILED DESCRIPTION OF THE INVENTION

Hereinafter, the present invention is described with reference to the attached drawings.

First Embodiment

Figure 1:
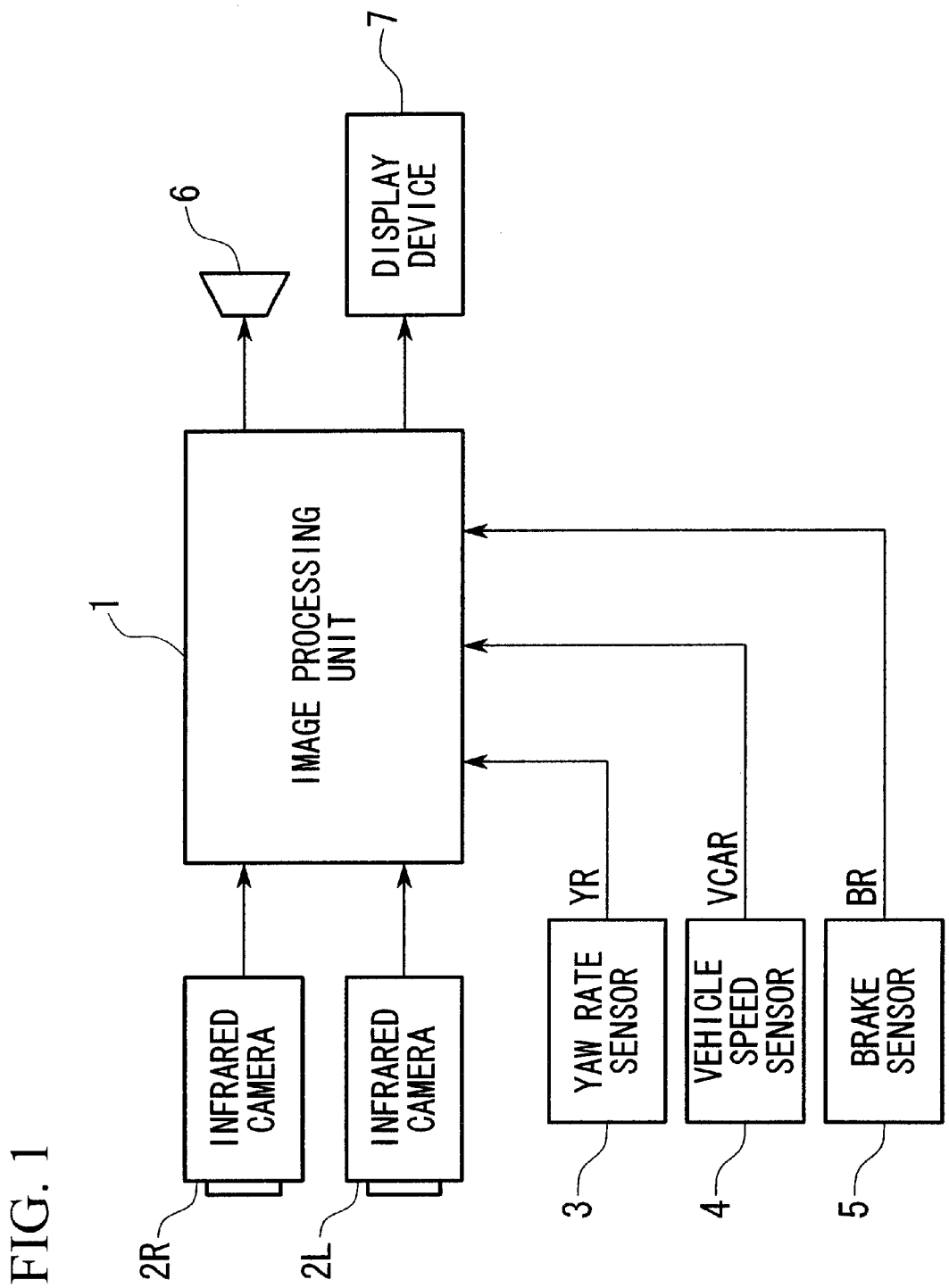
FIG. 1 is a diagram showing the construction of an infrared image-processing apparatus according to the first embodiment of the present invention.

FIG. 1 is a diagram showing the construction of an infrared image-processing apparatus according to the first embodiment of the present invention.

In FIG. 1, numeral 1 denotes an image-processing unit provided with a CPU (Central Processing Unit) for controlling an infrared image-processing apparatus according to the first embodiment of the present invention. The image-processing unit 1 comprises two infrared cameras 2R and 2L capable of detecting far infrared, a yaw rate sensor 3 for detecting the yaw rate of the present vehicle, a vehicle speed sensor 4 for sensing the travel speed of the present vehicle, and a brake sensor 5 for sensing the brake operation. The image-processing unit 1 plays a role in detecting moving objects such as pedestrians or animals through the infrared images around the present vehicle, and to raise an alarm when it is determined that the possibility of collision is high.

The image-processing unit 1 further comprises a speaker 6 for giving an alarm, and some type of display device(s) 7 for displaying images captured by the infrared cameras 2R and 2L and for making the driver of the vehicle aware of object(s) in the images, such as a meter integrated display device, in which the meter represents the traveling state of the present vehicle by numerals, a NAVI-Display provided on the console of the present vehicle, and a HUD (Heads Up Display) 7a for displaying information mounted behind the front windshield at a position where the driver's front view is not disturbed.

The image-processing unit 1 further comprises an A/D converter for converting input analog signals to digital signals, an image memory for storing digitized image signals, a CPU for executing various computing processing, a RAM (Random Access Memory) for storing data used for computation processing, a ROM (Read Only Memory) for storing programs, tables, maps, etc., and an output circuit for outputting driving signals of the speaker 6, and display signals of, for example, the display device, such as the HUD. The image-processing unit 1 is constructed such that the output signals of the infrared cameras 2R and 2L, the yaw rate sensor 3, the vehicle speed sensor 4, and the brake sensor 5 are input into the image-processing unit 1 after being converted to the digital signals.

Figure 2:
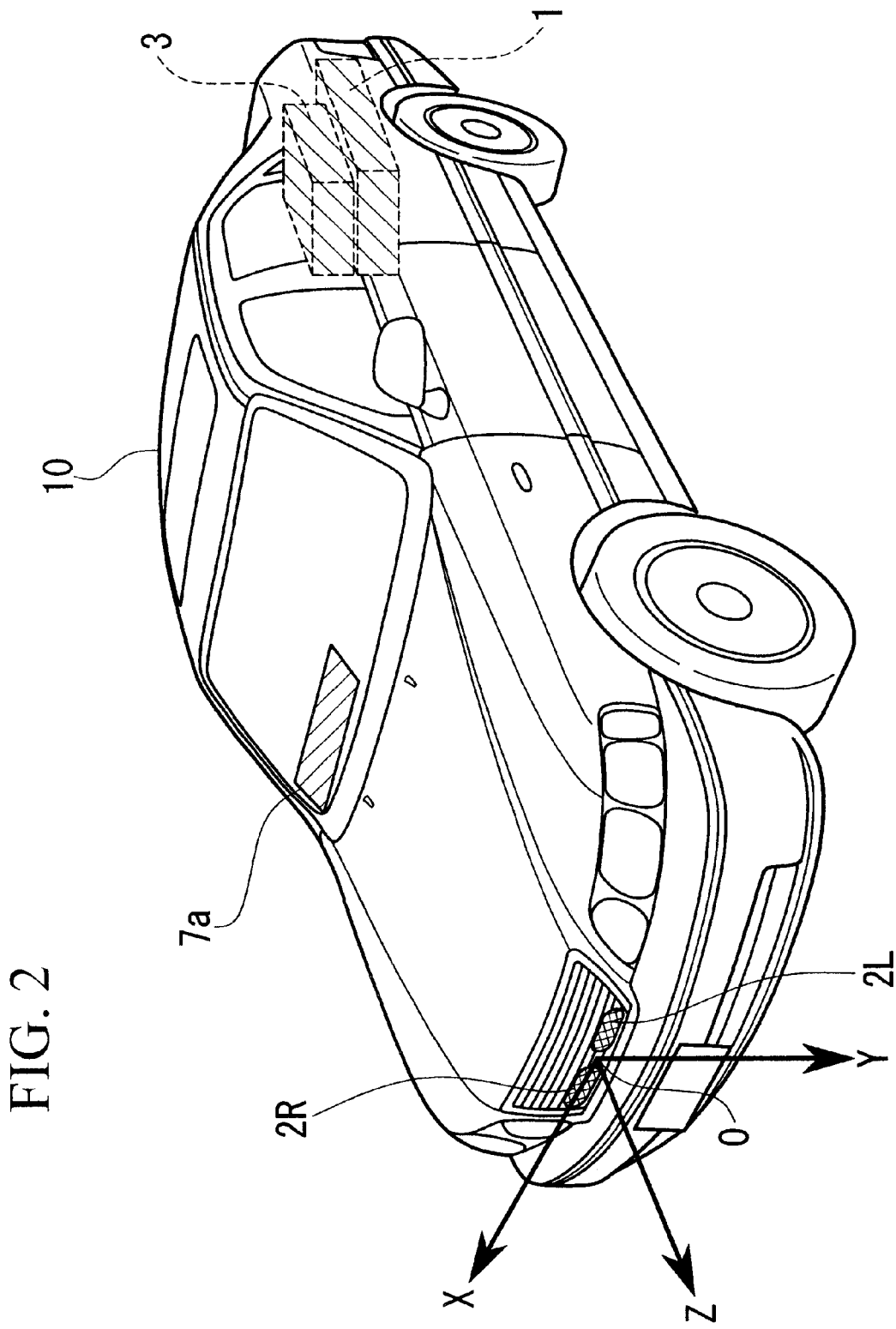
FIG. 2 is a diagram showing the positions on the vehicle for mounting infrared cameras, sensors, displays, etc.

As shown in FIG. 2, two infrared cameras 2R and 2L are disposed at front portions of the vehicle at symmetrical positions on both sides of the central axis of the vehicle. Both infrared cameras 2R and 2L are secured at the same height such that the optical axes of both cameras are parallel to each other.

Note that the infrared camera has a characteristic that the output signal level (brightness) increases as the temperature of the object increases. Again, note that the HUD 7a is disposed for displaying the images at a position where the driver's view is not impaired.

Below, operations of the present embodiment are described with reference to the attached drawings.

Figure 3:
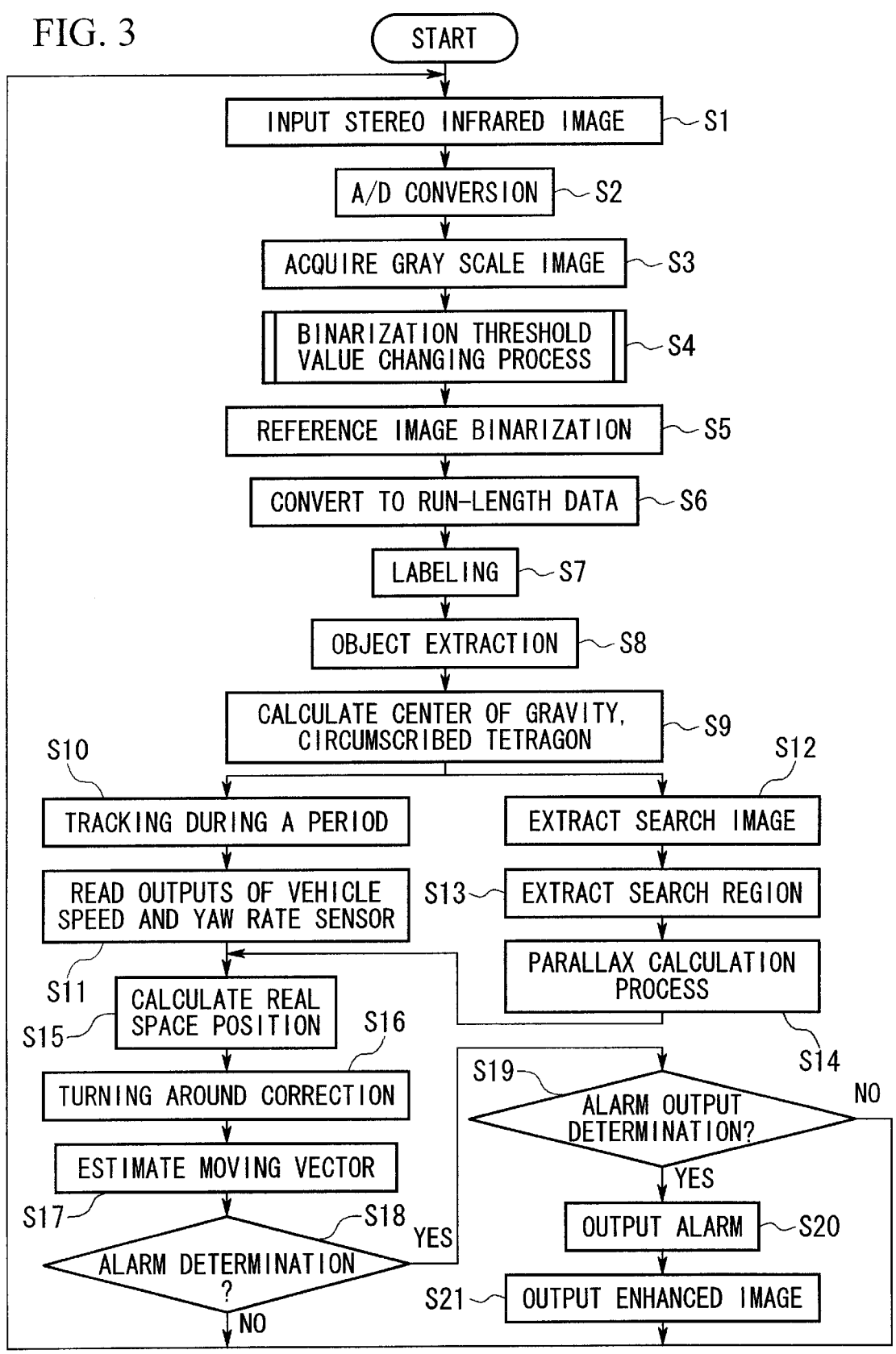
FIG. 3 is a flowchart showing the object detection operation and warning operation of the infrared image-processing apparatus according to the first embodiment of the present invention.

FIG. 3 is a flowchart showing operations for detected objects such as pedestrians and for generating an alarm.

First, the image-processing unit 1 acquires the infrared images as the output signals of the infrared cameras 2R and 2L (step S1), executes A/D conversion for converting analog signals to digital signals (step S2), and the digital gray scale image is stored in the image memory (step S3). Note that the infrared camera 2R acquires the right side image and the infrared camera 2L acquires the left side image. Since the right side image represents an image of an object at a position displaced in the horizontal direction from the object in the left side image, this displacement (parallax) enables calculation of the distance from the vehicle to the object.

Next, in order to distinguish the object image including other vehicles or pedestrians from the background image, the right side image obtained by the right side camera 2R is assigned as the reference image, and a binarization threshold value changing process for setting the brightness threshold value ITH is executed (step S4). The binarization threshold changing process is described in a section below in detail in relation to FIG. 7.

When the brightness threshold value ITH used for binarization processing is determined in step S4, image signals of the reference image are binarized, that is, the regions brighter than the threshold brightness value ITH are set to "1" (white), and the regions darker than the threshold brightness value ITH are set to "0" (black) (step S5).

Figure 4A:
FIGS. 4A and 4B shows a gray scale image (FIG. 4A) and its binarized image (FIG. 4B).
Figure 4B:
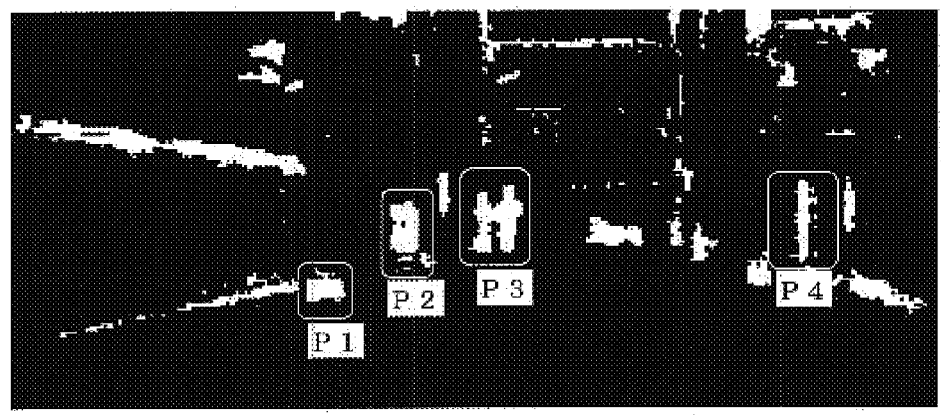
Figure 5:
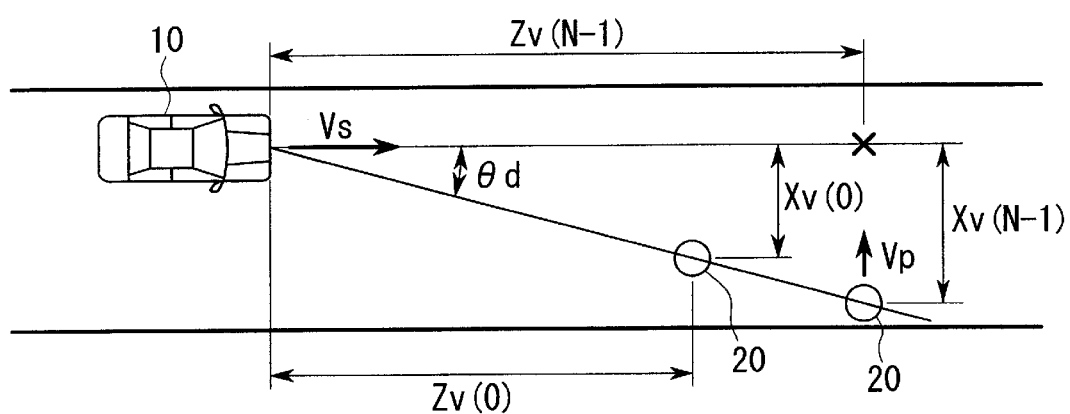
FIG. 5 is a diagram showing the case where a collision is likely to occur.

FIG. 4A shows a gray scale image acquired by the infrared camera 2R, and a binarized image is obtained as shown in FIG. 4B by binarization processing of the gray scale image. It is determined that bodies enclosed by frames from P1 to P4 in FIG. 4B are assigned as objects (hereinafter, called "high brightness regions").

When binarized image data are obtained, a processing is executed to convert the binarized image data into a run length data (step S6). A line of the run length data is formed by showing the white region determined by the binarization processing as lines of pixels. That is, the width of the run length line corresponds to that of one pixel, and the length of the run length line corresponds to the total length of pixels forming the line.

Next, in step S8, objects are extracted by marking the run length data converted from the image data (step S7) as objects. That is, the high brightness regions in FIG. 4B can be extracted as the object 1 to object 4, by estimating that an object is represented by a part where several run length lines overlap in the y-direction.

When objects are extracted, centers of gravity G, area sizes S, and aspect ratios ASPECT of circumscribed tetragons of objects are calculated (step S9).

The area sizes are obtained by adding lengths (run [i]–1) of run length data for the same object A, assuming that the run length data for the A region is represented by (x [i], y [i], A), where (i=0, 1, 2, ..., N–1). The coordinate (xc, yc) of the center of gravity G of the object A can be obtained by multiplying respective length (run [i]–1) of the run length data and respective coordinates (x [i] or y [i]), by adding the respective multiplication products, and by dividing the result of addition by the area size S.

In addition, the aspect ratio can be obtained as the ratio of the horizontal length to the vertical length of the circumscribed tetragon of the object.

Note that, since the run length data line is represented by the number of pixels (run [i]), the actual length of the run length data line is represented as (run [i]–1). The center of gravity of an object can be substituted as the center of gravity of the circumscribed tetragon.

Once the center of gravity G, the area S, and the aspect ratio are obtained for an object, the object is traced as time series data, that is, the object is identified in each sampling cycle (step S10). The time series trace is performed to determine whether two objects A and B extracted at time k, which is a discrete time of an analog time t, are the same as the objects C and D, which are extracted at the discrete time (k+1). When it is determined that the objects A and B are the same as the objects C and D, the objects C and D are labeled as the objects A and B and the same processing is repeated as the time series trace.

The position (center of gravity) coordinates of respective objects are stored in the memory as the time sequence position data for use in the later calculations.

The above-described processing in steps S5 to S10 are executed for the binarized reference image (in this embodiment, the right image).

Next, the image-processing unit reads the vehicle speed VCAR detected by the vehicle speed sensor 4 and the yaw rate YR detected by the yaw rate sensor 3, and executes the time integral of the yaw rate, for consequently obtaining the turning angle θr of the present vehicle 10 (step S11).

Parallel to the processing in steps S10 and S11, a process to calculate the distance between the object and the present vehicle 10 is executed in steps S12 to S14. Since the process requires a longer time than steps S10 and S11, calculations in steps S12 to S14 are executed for a longer cycle period than that of steps S10 and S11 (for example, the cycle period of about three times longer than the cycle period for steps S10 and S11).

One of the object images found in the binarized image of the reference image (the right image) is selected and the selected image is assigned as a search image R1 (entire region surrounded by the circumscribed tetragon) in the right image (step S12).

A search region (hereinafter, called a corresponding image) is set in the left image for searching the image corresponding to the search image R1 in the right image (step S13). Practically, a search region R2 is set in the left image according to top positions of the circumscribed tetragon of the search image R1. A summation value of the brightness difference C (a, b), which indicates the correlation level of the search image R1 to the search region R2 is calculated, and the region where the summation value of the brightness difference becomes minimum is extracted as the corresponding image. Note that this correlation calculation is executed using the gray scale image, not the binarized image.

When the position data obtained in the past is available, a region R2a, which is narrower than the region R2, can be set as the search region.

In accordance with processing in step S13, the search image R1 is extracted in the reference image (right image) and the search image R4 corresponding to the same object in the right image is extracted, centers of gravity of both of the search image R1 and the corresponding image R4 and parallax Δd (the number of pixels) are obtained and the distance between the present vehicle 10 and the object is calculated (step S14).

Next, when the process to calculate the turning angle θr in step S11 and process to calculate the distance between the present vehicle 10 and the object in step S14 are completed, the coordinate (x, y) in the image and the distance z are converted into a real coordinates (X, Y, Z) (step S15).

As shown in FIG. 2, the real coordinates (X, Y, Z) are formed by appointing the center position of two infrared cameras (a fixed position of the present vehicle 10) as the origin of the coordinates. In contrast, the coordinates of the image are formed by appointing the center of the image as the origin of the coordinates, and the x-axis is appointed as the horizontal direction, and the y-axis as the vertical direction.

When the real coordinates are determined, the turning angle correction of the present vehicle 10 is performed in order to correct the positional displacement of the vehicle caused by the turning of the present vehicle 10 (step S16). The correction process based on the turning angle of the vehicle is to correct displacement of the vehicle by Δx in the x direction in the image captured by the camera, when the present vehicle 10 turns by the angle of θr to the left side within a period from time k to time (k+1).

Note that the coordinates (X, Y, Z) after performing the turning angle correction is used in the following explanation.

When the turning angle correction has been completed, an approximated line LMV, which corresponds to the relative movement vector of the object to the present vehicle 10, is obtained from N (N=approximately 10) pieces or coordinates of the true space position data, that is, as the time series data, obtained during a monitoring period of ΔT as data after the turning correction (step S17).

Subsequently, the present position P=(X (0), Y (0), Z (0)) and the previous (N−1) sampling position (before time ΔT) P (X (N−1), Y (N−1), Z (N−1)) are corrected to the positions on the approximated line LMV, and the corrected coordinates Pv (0)=(Xv (0), Yv (0), Zv (0)) and Pv (N−1)=(Xv (0), Yv (0), Zv (0)) are obtained.

The relative movement vector as the vector moving towards the position Pv (N−1) to the position Pv (0) is obtained by the above procedure.

As described above, calculation of the relative movement locus of the object for the present vehicle 10 using a plurality (N pieces) of data obtained in a monitoring period and the subsequent acquisition of the relative movement vector which approximates the relative movement of the object to the present vehicle 10 makes it possible to reduce the position detecting error of the object and to accurately predict the possibility of collision with the object.

In addition, after the relative movement vector is obtained, an alarm determination process to determine the possibility of collision with the detected object is performed (step S18).

The alarm determination process (step S18) is a process for detecting the possibility of collision of the present vehicle 10 with the detected object by executing the following processes, such as a collision determination process, an adjacent collision determination process to determine whether the vehicle is in an adjacent region, and an approach collision region determination process to determine whether the vehicle approaches to the adjacent region.

The adjacent collision determination process to determine whether the present vehicle is adjacent to the detected object is conducted when it is determined that the present vehicle may collide with the object. Furthermore, the approach collision region determination process for determining whether the vehicle approaches an adjacent region is conducted when it is determined in the adjacent collision determination process that there is little chance for the present vehicle colliding with the object.

Hereinafter, an example is described below in the case where an object 20 moves on towards the present vehicle at a speed of Vp from the direction of 90 degrees for the traveling direction of the present vehicle.

First, the collision determination process is executed by first obtaining the relative speed Vs of the object to the present vehicle 10 in the z-direction, in the case where the object approaches to the present vehicle 10 from the distance Zv (N−1) to the distance Zv (0) during the monitoring time of ΔT, and then determining whether the object and the present vehicle collide within time having a margin of safety, assuming that the object and the present vehicle moves maintaining the relative speed Vs below a range of a height H. The time having a margin of safety (a margin time T) is determined so as to detect the possibility of collision time T earlier than the predicted time of collision. Therefore, the margin time T is set as 2 to 5 seconds. Note that the height H is a predetermined height to provide a range of heights for predicting the collision. Thus, the height H is normally assigned as a height which is two times higher than the height of the present vehicle.

The determination process is executed to determine whether the object is in an adjacent region AR1, which is the region where the present vehicle has a high possibility of colliding with the object if the present vehicle moves forward. The adjacent region AR1 is a part of the triangle area AR0, defined as a viewable area by the infrared cameras 2R and 2L, shown by the bold lines in FIG. 6, wherein the adjacent region AR1 has a distance from the present vehicle of below Z1=Vs×T and has the width of α+2β, where α is the width of the present vehicle and β is the margin width (for example, within a range of 50 to 100 cm) added on both side of the width of the present vehicle. Note that the adjacent region AR1 has the predetermined height of H.

Figure 6:
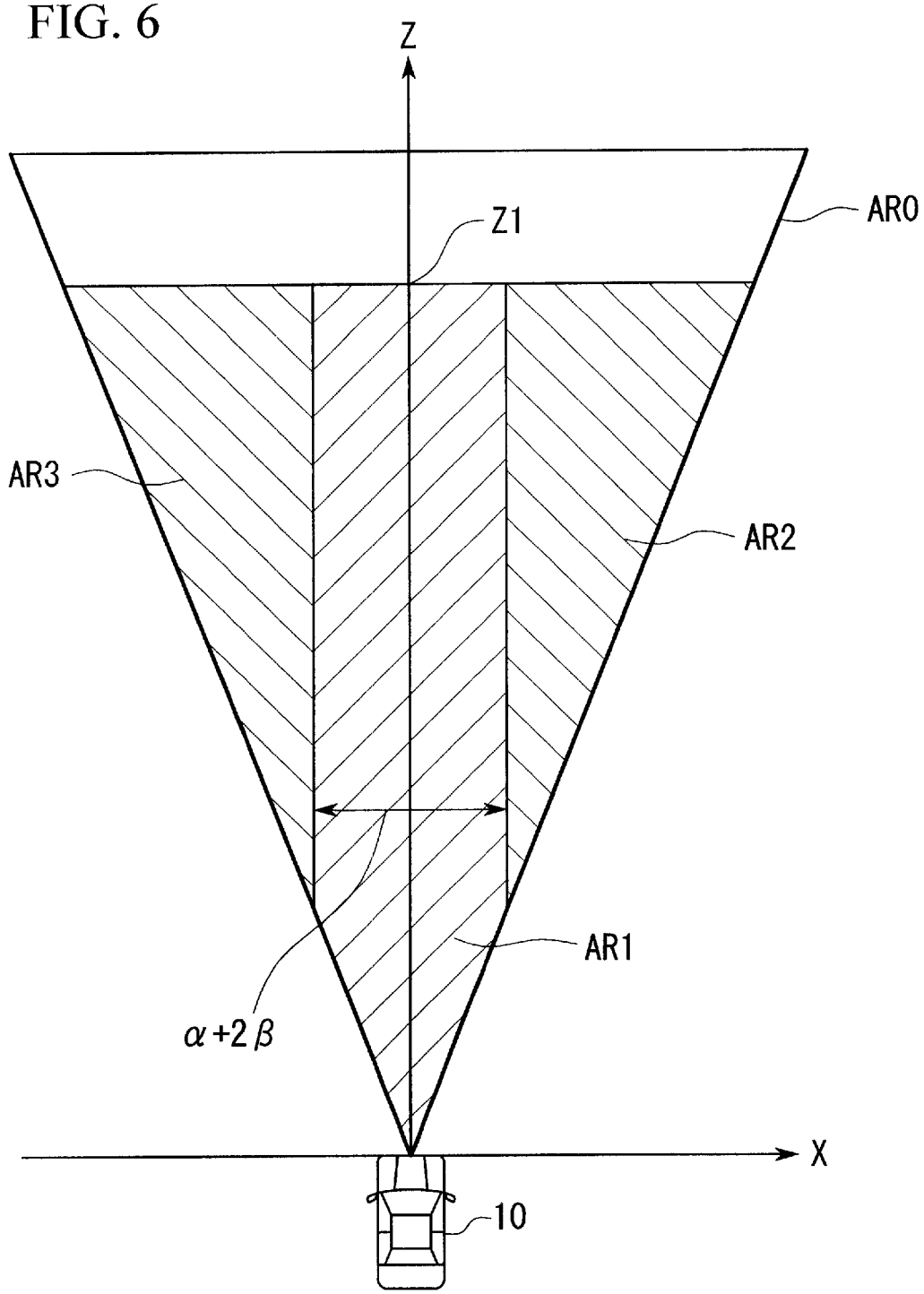
FIG. 6 is a diagram showing classified zones in front of the vehicle.

Furthermore, the approach collision determination process is a process to determine whether the object in the approach determination regions AR2 and AR3 moves and enters into the adjacent region AR1 and whether the object will collide with the present vehicle 10. The approach determination regions AR2 and AR3 are regions, which have higher X coordinates (higher width in the transverse direction of the adjacent region) than that of the adjacent region as shown in FIG. 6. Note that the approach determination regions AR2 and AR3 also have the same predetermined height H.

When it is determined that there is no possibility for the present vehicle colliding with an object in the alarm determination process (step S18), including the collision determination process, the adjacent determination process to determine whether the vehicle is in an adjacent region, and an approach collision region determination process for determining whether the vehicle approaches to the adjacent region (NO in step S18), the flow returns to step S1 and the above-described processes are repeated.

In the alarm determination process (step S18), if it is determined that there is a possibility of collision, and if it is further determined in the adjacent determination process or in the approach collision determination process that a collision with the object is possible (YES in step S18), the flow proceeds to the alarm output determination process in step S19.

In step S19, the alarm output determination process, that is, the determination as to whether the alarm is output, is executed by determining whether the driver of the present vehicle is operating the brake based on the output BR of the brake sensor 5 (step S19).

When it is determined that the brake of the present vehicle 10 is operated by the driver, an acceleration Gs (positive in the deceleration direction) generated by the brake operation is calculated, and when the acceleration is above a predetermined threshold value GTH, it is determined that a collision can be avoided by the brake operation, and the alarm output determination process is completed (NO in step S19), the flow returns to step S1, and the above-described processes are repeated.

When the proper brake operation is conducted, it is possible to stop outputting the alarm, and thereby avoid disturbing the driver.

In contrast, when the acceleration Gs is below the predetermined threshold, or if the driver of the present vehicle 10 is not operating the brake, the flow immediately proceeds to step S20 (YES in step S19), where the present vehicle has a high probability of contacting with the object, so that the sound alarm is outputted (step S20) and, for example, a right image picked up by the right infrared camera 2R is displayed on the display, and the approaching object is emphasized to warn the driver of the present vehicle (step S21).

Note that the predetermined threshold value GTH of the acceleration corresponds to the acceleration value, when the present vehicle can be stopped within the running distance of Zv (0), if this acceleration Gs generated by the braking operation is maintained.

As described above, the object extraction and the alarm output operations are executed by the image-processing unit 1 of the infrared image-processing apparatus according to the present embodiment. Below, a detailed explanation is given concerning the binarization threshold value changing process in step S4 in the flowchart shown in FIG. 3.

Figure 7:
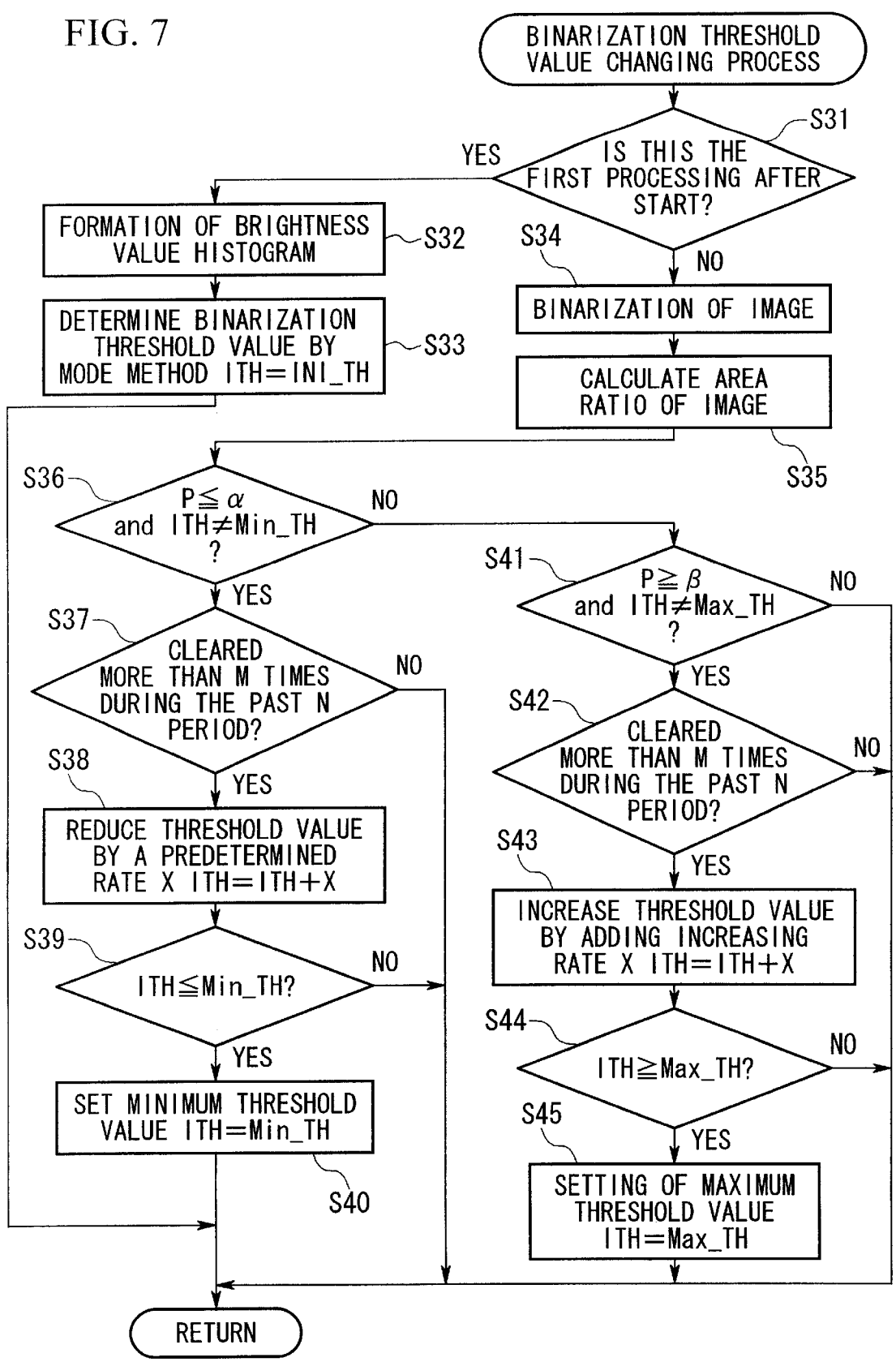
FIG. 7 is a flowchart showing the binarization threshold value changing process according to the first embodiment of the present invention.

FIG. 7 is a flowchart showing operations of binarization threshold value changing processing according to the present embodiment of the present invention.

In FIG. 7, the image-processing unit 1 determines whether this is the first binarization threshold value changing process after the image-processing unit 1 is started (step S31).

In step 31, when it is determined that this is the first binarization processing after the image-processing unit has been started (YES in step S31), the image-processing unit 1 prepares a brightness histogram of the gray scale image, which has been obtained in step S3 in the flowchart shown in FIG. 3 (step S32). In the gray scale image, a higher temperature region is represented as a whiter or as a higher brightness region. The histogram of the gray scale image is obtained by indicating the brightness in the abscissa and the number of pixels at a certain brightness, that is, the frequency of pixels at a corresponding brightness is represented as H [I] in the vertical axis direction.

Figure 8:
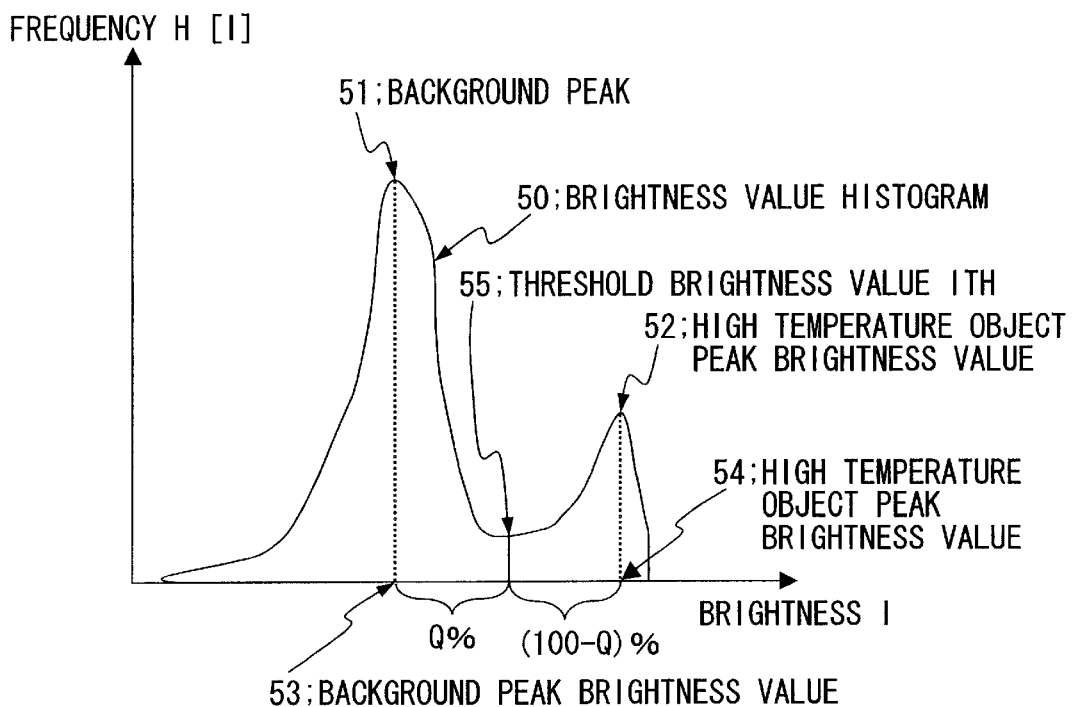
FIG. 8 is a diagram showing the binarized threshold setting process by a mode method according to the first embodiment of the present invention.

From the brightness histogram as described above, an initial value INI_TH is set for the brightness threshold value by a mode method. The binarization threshold value setting by the mode method is executed as shown in FIG. 8 (step S33). The binarization threshold value setting by the mode method is executed by first obtaining two brightness values of the background peak and the object peak appearing in the brightness histogram and then obtaining a threshold brightness value ITH55 as a value which divides the brightness difference between the background peak brightness value and the high temperature object peak brightness values by a ratio of Q [%] and (1−Q) [%].

In the operations of the initial binarization threshold value changing process, after the initial value INI_TH is set for the brightness threshold value ITH by the mode method, the operation of the binarization threshold value changing process is ended and the flow returns to step S5 shown in FIG. 3 and the object detection and the alarm outputting operation is continuously executed.

In contrast, if the operation in step S31 is not the initial binarization threshold changing process after the image-processing unit 1 has been started (NO in step S31), the image-processing unit 1 executes the binarization processing for the right image picked up at this time by the infrared camera 2R as the reference image using the brightness threshold value ITH obtained in the previous processing (step S34).

Next, the binarization area ratio P of the binarized image is calculated (step S35). Here, the binarization area ratio indicates the ratio of the object image for binarization to the entire image and is defined by the following equation.

$$P = \text{total pixel numbers of the object for binarization/total pixel numbers of the entire image for binarization} \times 100 \, [\%]$$

After the binarization area ratio has been obtained, it is determined whether the binarization area ratio is below a prescribed value $\alpha$ [%] and whether the brightness threshold value ITH is the minimum brightness value Min_TH (step S36).

When it is determined that the binarization area ratio is below a prescribed value $\alpha$ [%] and the brightness threshold value ITH is not the minimum brightness value Min_TH (YES in step S36), it is determined in step S37 whether the conditions in step S36 have been cleared more than M times within the past period of N seconds (for example, 1 second). Note that the determination results are subjected to the averaging operation in order to avoid hunting of the processing operations of the binarization threshold value changing process.

In step S37, when the conditions in step S36 are cleared more than M times within the period of N seconds (YES in step S37), a value at a predetermined rate X is subtracted from the brightness threshold value ITH for reducing the brightness threshold value (step S38).

It is determined in step S39 whether the brightness threshold value is below the minimum brightness threshold value Min_TH (step S39).

When it is determined in step S39 that the brightness threshold value is below the minimum brightness threshold value Min_TH (YES in step S39), the threshold brightness value ITH is set to the minimum brightness threshold value Min_TH (step S40).

Furthermore, when it is determined in step S37, that the conditions in step S36 is not cleared for more than M times within the past period of N seconds (NO in step S37), the binarization threshold value changing process operation is completed.

In addition, when it is determined in step S39 that the brightness threshold value ITH is not below the minimum brightness threshold value Min_TH (NO in step S39), the binarization threshold value changing process operation is also completed.

In contrast, when it is determined in step S36 that the binarization area ratio P is above a prescribed value $\alpha$ (%) and/or the brightness threshold value ITH is equal to the minimum brightness value Min_TH (NO in step S36), it is determined whether the binarization area ratio P is above a prescribed value $\beta$ (%) and whether the brightness threshold value ITH is equal to the maximum brightness threshold value Max_TH (step S41).

In step S41, when it is determined that the binarization area ratio P is above a prescribed value $\beta$ (%) and that the brightness threshold value ITH is not the maximum brightness threshold value Max_TH (YES in step S41), it is determined whether the conditions in step S41 have been cleared more than M times during the past period of N seconds (for example, one second) (step S42). Note that the determination results are subjected to the averaging operation in order to avoid hunting in operations of the binarization threshold value changing process.

When it is determined in step S42 that the conditions in step S41 is cleared more than M times within the period of N seconds (YES in step S42), a prescribed ratio X is added to the brightness threshold value ITH for increasing the brightness threshold value ITH (step S43).

Subsequently, it is determined whether the brightness threshold value ITH is above the maximum brightness threshold value Max_TH (step S44).

When it is determined in step S44 that the brightness threshold value ITH is above the maximum brightness threshold value Max_TH (YES in step S44), the brightness threshold value ITH is set to the maximum brightness threshold value Max_TH (step S45). When, in contrast, it is determined in step S41 that the binarization area ratio P is below a prescribed value $\beta$ (%) or that the brightness threshold value ITH is the maximum brightness threshold value Max_TH (NO in step S41), the binarization threshold value changing process operation is completed.

When it is determined in step S42 that the conditions in step S41 have been cleared more than M times within the past period of N seconds (step S42), the binarization threshold value changing process operation is also completed.

Furthermore, when it is determined in step S44 that the brightness threshold value ITH is not above the maximum brightness threshold value Max_TH (NO in step S44), the binarization threshold value changing process operation is completed.

Note that the aforementioned minimum brightness threshold value Min_TH is a lower limit value of the brightness threshold values, obtained as a brightness value so as not to be affected by the road surface due to environmental variation.

Figure 9:
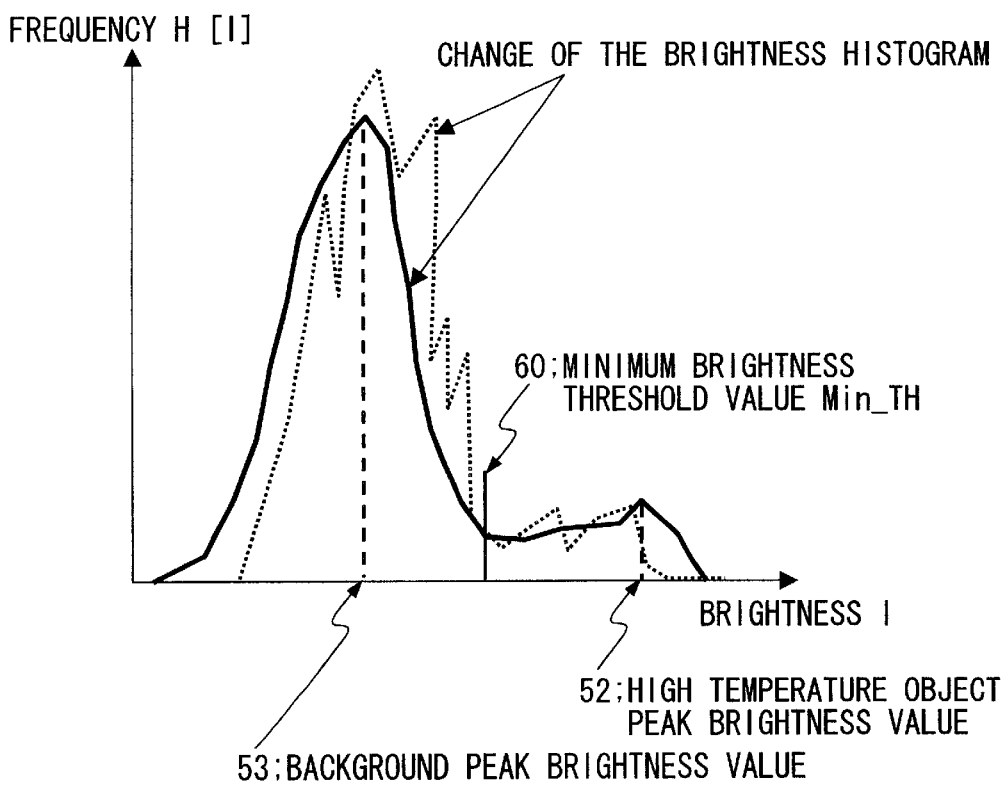
FIG. 9 is a diagram showing a setting process of the minimum brightness threshold value according to the first embodiment of the present invention.

The setting of the minimum brightness threshold value is described below with reference to the attached drawings. As shown in FIG. 9, the minimum brightness threshold value Min_TH 60 is obtained so as to satisfy the following conditions.

(1) The minimum brightness threshold value is set at a brightness value in between the background peak brightness and the object peak brightness so as to be able to reliably extract the higher temperature object.

(2) The minimum brightness threshold value is set at a brightness value so as to be able to reliably extract the higher temperature object without being affected by the dispersion due to noise of an image.

Figure 10A:
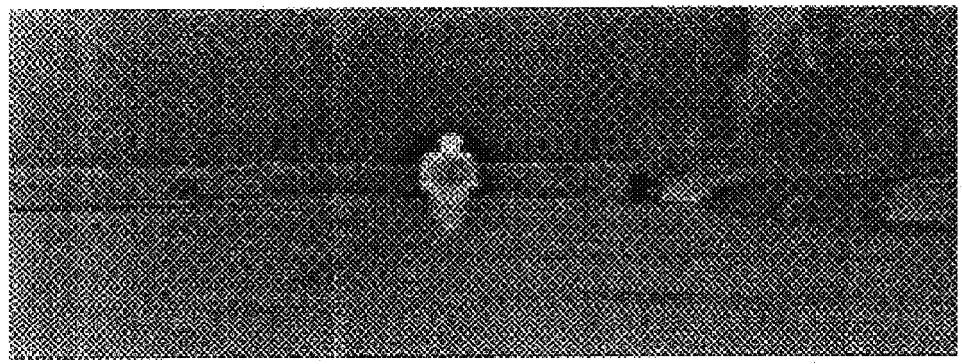
FIGS. 10A and 10B are diagrams showing the binarized image (10B) of the infrared image (10A) using a threshold value which is lower than the minimum brightness threshold value.
Figure 10B:

Note that if a threshold value below the minimum brightness threshold value Min_TH is used for binarization process of the image shown in FIG. 10A, road shoulders and background images are extracted in addition to the pedestrian as shown in FIG. 10B.

In addition, the maximum brightness threshold value is an upper limit brightness threshold value used for the binarization process of an image, and the maximum brightness threshold value is set at a brightness value so as not to fail in extracting the object irrespective of environmental variations under the following conditions.

Setting of the maximum brightness threshold value Max_TH is described below with reference to the attached drawing. As shown in FIG. 11, the maximum brightness threshold value Max_TH 61 is set as follows.

(1) The maximum brightness threshold value Max_TH is set at a brightness value in between the minimum brightness threshold value Min_TH and a brightness value corresponding to the high temperature object peak in the brightness histogram, or in between the minimum brightness threshold value Min_TH and a maximum brightness of the high temperature object in the brightness histogram, providing that the object cannot be extracted by a threshold brightness above the maximum brightness threshold value.

The aforementioned environmental variation means the change of the environmental temperature of the vehicle by transition of seasons, by leading the vehicle out of a garage, or by traveling behind another vehicle, or by other reasons.

In addition, the prescribed values α and β for determining the binarization area ratio P is preferably below 10%, because the actual image inevitably contains the road surface or sky in the actual traveling environment.

Note that the binarization threshold value changing process is performed using an image picked up by the infrared camera 2R.

In addition, in the present embodiment, the image-processing unit 1 comprises the brightness threshold value setting device. Practically speaking, step S4 in FIG. 3 and steps S31 to S45 in FIG. 7 correspond to the brightness threshold value setting device.

As described above, in the binarization processing of an infrared image for extracting an object such as a pedestrian from the image, the infrared image-processing apparatus according to the present embodiment changes the threshold brightness value ITH in a range from the lower limit threshold value, that is, the minimum brightness threshold value Min_TH to the maximum brightness threshold value, that is, the maximum brightness threshold value Max_TH such that the area of the object image is optimized to be a predetermined area. Furthermore, when the brightness threshold value is being changed, it is determined how many times the threshold value changing conditions are fulfilled within a predetermined period of time, and the predetermined brightness threshold value is reduced or increased by subtracting a predetermined ratio X or by incrementing a predetermined ratio X from or to the predetermined threshold value ITH, which stabilize binarization processing by preventing the threshold setting process operations from hunting and also preventing the binarization setting operation from being sensitive to environmental variations.

Second Embodiment

Next, a second embodiment of the present invention is explained below with reference to the attached drawings.

Figure 12:
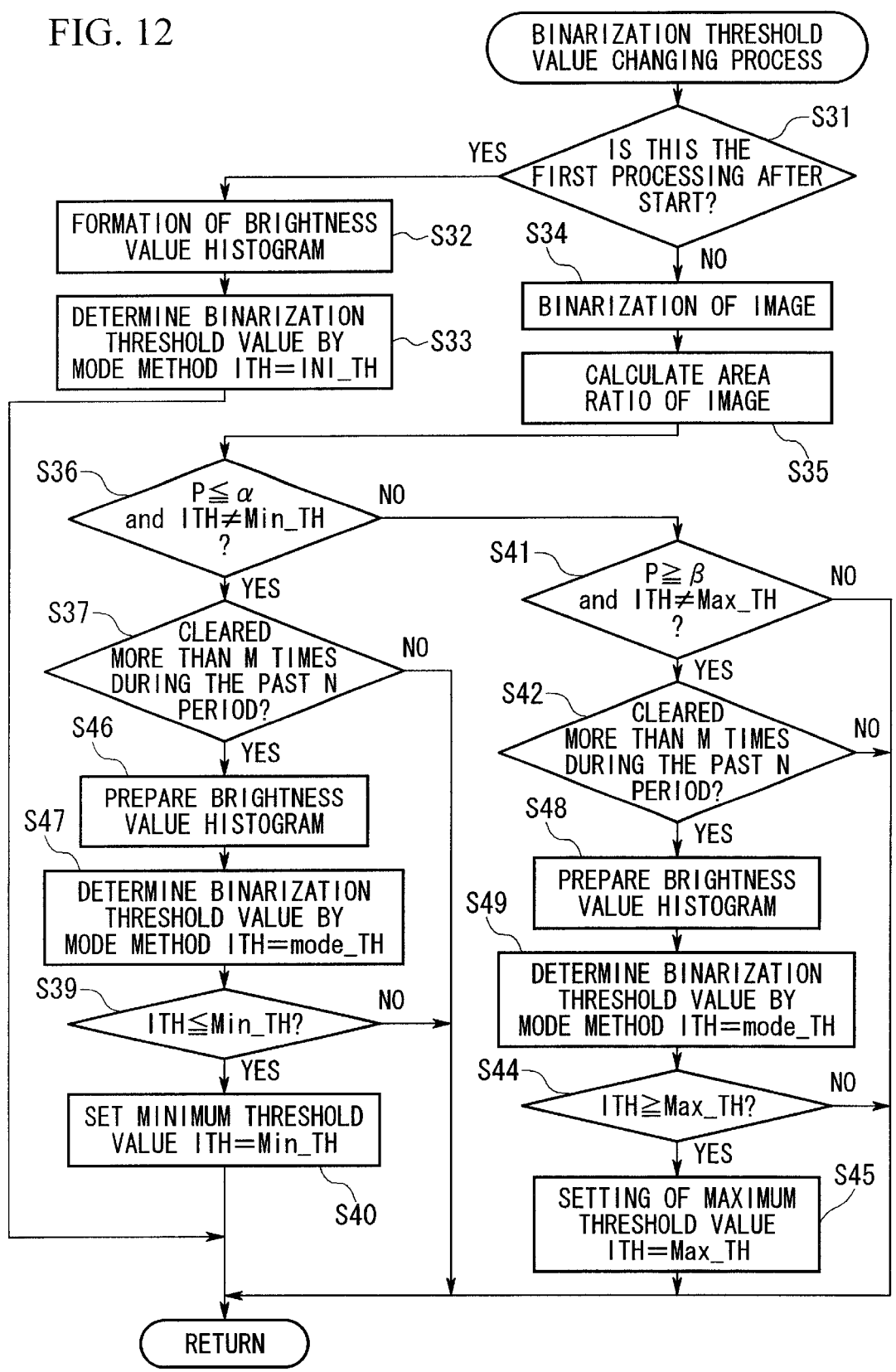
FIG. 12 is a flowchart for binarization threshold value changing process according to the second embodiment of the present invention.

The infrared image-processing operations according to the second embodiment of the present invention differs from that of the first embodiment of the present invention in that the flowchart shown in FIG. 7, used for the binarization threshold changing operations by the image-processing unit 1 of the infrared image-processing apparatus in the first embodiment, is changed to the binarization threshold value changing operations shown by the flowchart in FIG. 12.

Note that the construction of the infrared image-processing apparatus and the operations other than the binarization threshold value changing operations are the same as those of the first embodiment, so that the explanations are omitted.

The binarization threshold value changing process operations in the second embodiment is described in detail below with reference to FIG. 12.

The operations of the binarization threshold value changing process according to the second embodiment differs from the operations of the binarization threshold value changing process according to the first embodiment in that, in the operation of the binarization threshold value changing process from step S31 to step S45 shown in FIG. 7, the operation in step 38 in the first embodiment is replaced with the operations in steps S48 and S49 in the second embodiment, and the operation in step S43 in the first embodiment is replaced with the operations in steps S48 and S49 in the second embodiment. In addition, in the operations of the binarization threshold value changing process according to the present embodiment shown in FIG. 12, the operations in the steps having the same step numbers in the operations of the binarization threshold value changing process according to the first embodiment shown in FIG. 7 are the same as those described in the first embodiment.

Accordingly, the operations of the binarization threshold value changing process according to the second embodiment are described mainly concentrated on process steps S46, S47, S48, and S49.

Similarly to the first embodiment, operations of process steps S31 to S34 are executed and the binarized area ratio P of the binarized reference image is obtained in step S35. If it is determined in step S36 that the area ratio P is less than α (%), and that the brightness threshold value ITH is not the minimum brightness threshold value Min_TH (YES in step S36), the determination results are subjected to the averaging operation in step S36 in order to prevent hunting of the operations of the binarization threshold value changing process (YES in step S37).

In the case of operations of the binarization threshold value changing according to the first embodiment, the brightness threshold value ITH has been reduced by subtracting a predetermined ratio from the brightness threshold value obtained in step S38.

In contrast, in the case of the second embodiment, the image-processing unit 1 prepares a brightness histogram using the gray scale image obtained in step S3 shown in FIG. 3, similarly to the step S32 of FIG. 7 in the first embodiment (step S46).

A new threshold value mode_TH obtained from the above brightness histogram using the mode method is set to the brightness threshold value ITH (step S47). Since setting of the binarization threshold value using the mode method has been described in the first embodiment with reference to FIG. 8, the explanation of the mode method is omitted.

In step S47, after a new threshold value has been set to the brightness threshold value ITH, the process operations in steps 39 to 40 are carried out, similarly to the first embodiment, and the operations of the binarization threshold value changing processes are completed.

In contrast, when the conditions are not satisfied in step S36 (NO in step S6), the flow proceeds to step S41. When it is determined in step S41 that the binarization area ratio P obtained in step S35 is above β (%), and that the brightness threshold value ITH is not the maximum brightness threshold value Max_TH (YES in step S41), the determination results in step S41 are subjected to the averaging operation in the subsequent step S42 (YES in step S41).

Subsequently, in operations of the binarization threshold value changing processes according to the second embodiment, the image-processing unit 1 forms a brightness value histogram based on the gray scale image obtained in step S3 in the flowchart shown in FIG. 3 (step S48), in contrast to incrementing the threshold brightness value ITH by a predetermined ratio in step S43 in operations of the binarization brightness value changing processes according to the first embodiment.

In step S49, a new brightness threshold value mode_TH is obtained from the above histogram by the mode method and the new brightness threshold value mode_TH is set to the threshold value.

In step S49, when the new threshold value is set to the brightness threshold value ITH, processing in step S44 to S45 is executed similarly to the first embodiment, and operations of the binary threshold value changing process is completed.

Note that the above binarization threshold value changing process is carried out using the right image obtained by the infrared camera 2R, similarly to the first embodiment.

The brightness threshold setting device included in the image-processing unit 1 corresponds to step S4 in FIG. 3 described earlier in the first embodiment and steps S31 to S37, S39 to S42, and S46 and 49 shown in FIG. 12.

As described above, the infrared image-processing apparatus of the present invention changes the brightness threshold value, used in the binarization processing in order to extract an object such as a pedestrian from an infrared image, such that the area size to be extracted by the binarization processing enters within a predetermined range from the minimum brightness threshold value Min_TH to the maximum brightness threshold value Max_TH. In the case of changing the brightness threshold value ITH, the number of times satisfying the threshold value changing conditions within a predetermined period of time is counted and the threshold value is directly set by the mode method, so that it becomes possible to prevent the threshold setting process from hunting and to set the accurate threshold value for the binarization process quickly.

In the above description, the "area" of the object is normally used to indicate the binarization area ratio. In addition, it is noted that the "area" of the object image extracted by the binarization" also indicates the total pixel numbers of the object for binarization.

Although there have been described what are the present embodiments of the invention, it will be understood by persons skilled in the art that variations and modifications may be made thereto without departing from the spirit or essence of the invention.

What is claimed is:

1. An infrared image-processing apparatus, which executes binarization process for an infrared image captured by an infrared camera by setting a threshold value in between two brightness values corresponding to two peak frequencies appearing in a brightness histogram, which are connected to a background image and an object image, comprising:

a converter which converts the infrared image to binary data; and a brightness threshold value setting section for changing said threshold value such that the area of the image extracted by said binarization processing enters a predetermined range.

2. An infrared image-processing apparatus according to claim 1, wherein said brightness value setting section is provided in advance with a minimum brightness value, which is above the brightness value corresponding to the peak frequency associated with the background image, and a maximum brightness value, which is below the brightness value corresponding to the peak frequency associated with the peak frequency associated with an object image.

3. An infrared image-processing apparatus according to claim 1, wherein said brightness value setting section incrementally adjusts said threshold value.

4. An infrared image-processing apparatus according to claim 1, wherein said brightness value setting section prepares a brightness value histogram of said infrared image and determines and changes said threshold value based on said brightness value histogram.

* * * * *

UNITED STATES PATENT AND TRADEMARK OFFICE
CERTIFICATE OF CORRECTION

PATENT NO. : 6,690,011 B2
DATED : February 10, 2004
INVENTOR(S) : Watanabe et al.

It is certified that error appears in the above-identified patent and that said Letters Patent is hereby corrected as shown below:

Title page,
Item [57], ABSTRACT,
Line 11, change "Similarly, when the binarization area ratio P is above pre-determined" to -- Similarly, when the binarization are ratio P is above a pre-determined --.

Column 1,
Line 63, change "change in the brightness histograin" to -- change in the brightness histogram --.

Column 13,
Line 32, change "executes binarization process" to -- executes binarization processing --.

Column 14,
Line 8, change "a brightness threshold value setting section for changing" to -- a brightness threshold value section which changes --.

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,690,011 B2
DATED : February 10, 2004
INVENTOR(S) : Watanabe et al.

It is certified that error appears in the above-identified patent and that said Letters Patent is hereby corrected as shown below:

Title page,
Item [57], ABSTRACT,
Line 11, change "Similarly, when the binarization area ratio P is above pre-determined" to -- Similarly, when the binarization area ratio P is above a pre-determined --.

Column 1,
Line 63, change "change in the brightness histograin" to -- change in the brightness histogram --.

Column 13,
Line 32, change "executes binarization process" to -- executes binarization processing --.

Column 14,
Line 8, change "a brightness threshold value setting section for changing" to -- a brightness threshold value setting section which changes --.

This certificate supersedes Certificate of Correction issued June 1, 2004.

Signed and Sealed this

Thirty-first Day of August, 2004

JON W. DUDAS
*Acting Director of the United States Patent and Trademark Office*